US009145929B2

(12) United States Patent
George (10) Patent No.: US 9,145,929 B2
(45) Date of Patent: Sep. 29, 2015

(54) CLIP SEAL WITH INTEGRATED RETURN SPRING

(75) Inventor: Philip George, Wooster, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 1168 days.

(21) Appl. No.: 13/110,975

(22) Filed: May 19, 2011

(65) Prior Publication Data

US 2011/0290612 A1 Dec. 1, 2011

Related U.S. Application Data

(60) Provisional application No. 61/348,031, filed on May 25, 2010.

(51) Int. Cl.
| F16D 25/06 | (2006.01) |
| F16J 1/00 | (2006.01) |
| F16D 25/12 | (2006.01) |
| F16D 48/02 | (2006.01) |

(52) U.S. Cl.
CPC ............. *F16D 25/12* (2013.01); *F16D 25/06* (2013.01); *F16D 2048/0212* (2013.01)

(58) Field of Classification Search
CPC . F16D 25/06; F16D 25/0635; F16D 25/0638; F16D 25/12; F16D 2048/0212; F16J 1/003; F16J 1/008
USPC ........... 277/436–439; 192/66.32, 85.1, 85.25, 192/85.39, 85.44, 110 S
See application file for complete search history.

(56) References Cited

U.S. PATENT DOCUMENTS

| 4,509,627 A | * | 4/1985 | Kawamoto ................. 192/85.02 |
| 5,275,538 A | * | 1/1994 | Paliwoda et al. ............. 417/314 |
| 5,653,322 A | | 8/1997 | Vasa et al. |
| 5,893,445 A | | 4/1999 | Dover |
| 5,911,295 A | | 6/1999 | Itonaga et al. |
| 2008/0271968 A1 | * | 11/2008 | Metzinger et al. ........... 192/48.8 |
| 2008/0277228 A1 | * | 11/2008 | George ........................ 192/48.1 |
| 2010/0038201 A1 | | 2/2010 | Mueller et al. |

FOREIGN PATENT DOCUMENTS

| DE | 102009035918 | 2/2010 |
| EP | 1584830 | 10/2005 |

* cited by examiner

*Primary Examiner* — Gene Crawford
*Assistant Examiner* — Terry Chau
(74) *Attorney, Agent, or Firm* — Simpson & Simpson, PLLC (57) ABSTRACT

A piston subassembly for operating a clutch of a transmission including a piston, a compensation dam, wherein the piston is axially moveable with respect to the compensation dam, and a clip operatively affixed to the piston, the clip operatively arranged between the piston and the compensation dam, the clip including at least one spring element for exerting a force between the dam and the piston to pull the piston axially away from the compensation dam, wherein the compensation dam is included on a transmission shaft, the compensation dam including a radially inner flange having a slot, wherein the slot is operatively arranged to engage with a radial protrusion on the transmission shaft for forming a twist-lock between the compensation dam and the shaft.

18 Claims, 5 Drawing Sheets

CLIP SEAL WITH INTEGRATED RETURN SPRING

CROSS-REFERENCE TO RELATED APPLICATIONS

This application claims the benefit under 35 U.S.C. §119(e) of U.S. Provisional Application No. 61/348,031 filed on May 25, 2010 which application is incorporated herein by reference.

FIELD OF THE INVENTION

The invention broadly relates to transmissions, more specifically to piston subassemblies for engaging a clutch of a transmission, and even more particularly to a piston subassembly having an integrated return spring.

BACKGROUND OF THE INVENTION

Piston assemblies for engaging transmission clutches are known in the art. Typical rotating wet clutches for automobile transmissions include a closed fluid circuit for actuating a piston with respect to a centrifugal pressure compensation dam. A spring element, commonly a diaphragm spring or a package of coil springs, is usually situated between the piston and dam in order to return the piston to its fully open position when the piston chamber is depressurized, at which open position the clutch is disengaged. Typically, these systems are installed by first placing the piston in place, adding the return spring, then pressing the compensation dam against the spring to pre-load the spring, and finally installing a snap ring to hold the compensation dam in position to maintain the pre-loaded condition of the spring.

Although a common method of constructing a clutch system, snap rings continue to have a tendency to seat improperly when installed, and such improper seating is often not immediately identifiable. In some cases, improper seating of a snap ring may not be identified until later assembly steps, until the assembly is fully completed and finally tested, or even until it fails in the field after installation of the transmission in an automobile. That is, an improperly seated ring may dislodge and cause a loss of proper transmission function. U.S. Pat. No. 5,911,295 (Itonaga et al.), U.S. Pat. No. 5,893,445 (Dover), and U.S. Pat. No. 5,653,322 (Vasa et al.) are hereby incorporated by reference in their entireties. These patents each teach examples of conventional transmission clutch assemblies which include snap rings and return springs of various types.

BRIEF SUMMARY OF THE INVENTION

The present invention broadly comprises a piston subassembly for operating a clutch of a transmission including a piston, a compensation dam, wherein the piston is axially moveable with respect to the compensation dam, and a clip operatively affixed to the piston, the clip operatively arranged between the piston and the compensation dam, the clip including at least one spring element for exerting a force between the dam and the piston to pull the piston axially away from the compensation dam. In one embodiment, the compensation dam is included on a transmission shaft, the compensation dam including a radially inner flange having a slot, wherein the slot is operatively arranged to engage with a radial protrusion on the transmission shaft for forming a twist-lock between the compensation dam and the shaft.

In one embodiment, the slot includes a first portion for receiving the protrusion and a second portion for maintaining continuous locked engagement of the slot with the radial protrusion due to the force exerted by the clip on the dam. In another embodiment, the second portion of the slot comprises an axial indentation or notch. In another embodiment, the first portion of the slot comprises an axial strip. In one embodiment, the slot further comprises a third portion, the third portion extending in at least a circumferential direction between the first portion and the second portion for enabling the radial protrusion to transition from engagement with the first portion to engagement with the second portion. In yet another embodiment, the third portion is angled obliquely between the first portion and the second portion in both the circumferential direction and an axial direction.

In one embodiment the radial protrusion is a pin inserted into a hole in the shaft. In another embodiment, the pin is hollow for enabling a flow of fluid between the carrier and an inner bore of the shaft. In another embodiment, a flange of the piston extends axially past the compensation dam for engaging a clutch of a transmission due to an axial position of the piston. In yet another embodiment, the dam includes an axial bulge for enabling the clip to engage against the compensation dam while remaining affixed to the piston. In one embodiment, the piston subassembly further includes at least one seal between the piston and the compensation dam, the seal operatively arranged to enable the piston to remain in sealed engagement with the carrier while moving axially within the carrier. In one embodiment, the clip retains the at least one seal in engagement between the piston and the carrier. In yet another embodiment, the at least one spring element comprises a plurality of resilient fingers.

The current invention also broadly comprises a transmission assembly including a transmission shaft, a clutch carrier installed on the shaft, and, the piston subassembly described above, the piston subassembly housed within the carrier. In one embodiment, the compensation dam is installed on the transmission shaft, the compensation dam including a radially inner flange having a slot, wherein the slot is operatively arranged to engage with a radial protrusion on the transmission shaft for forming a twist-lock mechanism between the compensation dam and the shaft. In another embodiment, the slot includes a first portion for receiving the protrusion and a second portion for maintaining continuous locked engagement of the slot with the radial protrusion due to the force exerted by the at least one spring element on the dam.

The current invention also broadly comprises an assembly for operating a clutch of a transmission including a piston, a compensation dam, wherein the piston is axially moveable with respect to the compensation dam, a clip operatively affixed to the piston, the clip operatively arranged between the piston and the compensation dam, the clip including at least one spring element for exerting a force between the dam and the piston to pull the piston axially away from the compensation dam, the clip also retaining a seal for the piston, and wherein the compensation dam is included on a transmission shaft, the compensation dam including a radially inner flange having a slot, wherein the slot is operatively arranged to engage with a radial protrusion on the transmission shaft for forming a twist-lock between the compensation dam and the shaft, the slot including an axial strip for receiving the protrusion, an axial indentation for providing continuous locked engagement with the radial protrusion after assembly of the piston subassembly due to the force exerted by the clip on the dam, and a circumferential portion, the circumferential portion extending in at least the circumferential direction between the axial strip and the axial indentation for enabling the radial protrusion to transition from engagement with the axial strip to engagement with the axial indentation.

Accordingly, an object of the current invention is to design a transmission assembly which can be error checked more accurately during the assembly process. It is also an object of the current invention to reduce the number of necessary parts in order to provide more compact, cost-efficient assemblies.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 5A:
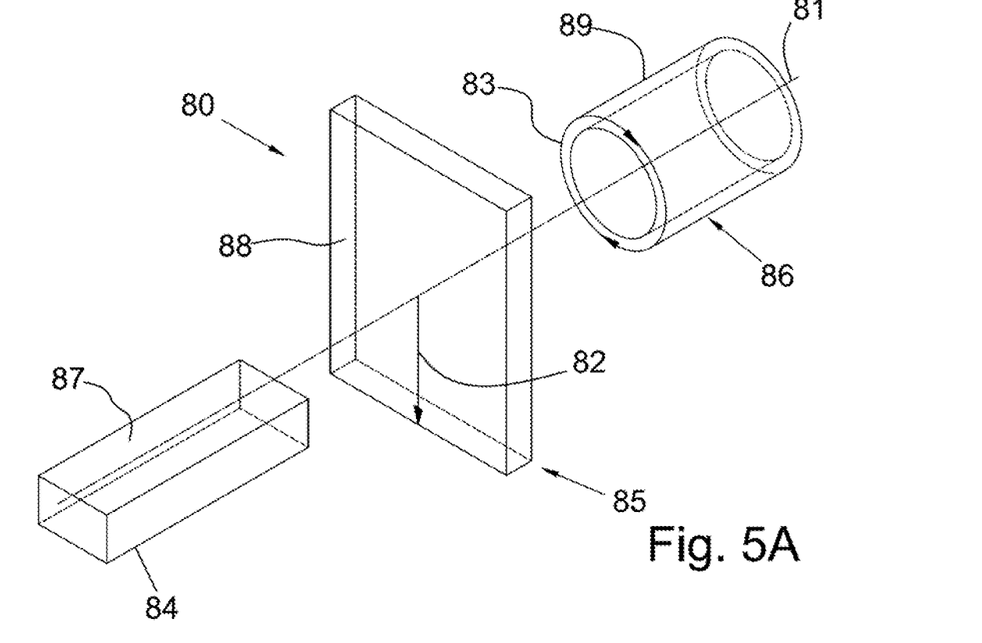
FIG. 5A is a perspective view of a cylindrical coordinate system demonstrating spatial terminology used in the present application; and, FIG. 5B is a perspective view of an object in the cylindrical coordinate system of FIG. 5A demonstrating spatial terminology used in the present application.

FIG. 5A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 5B:
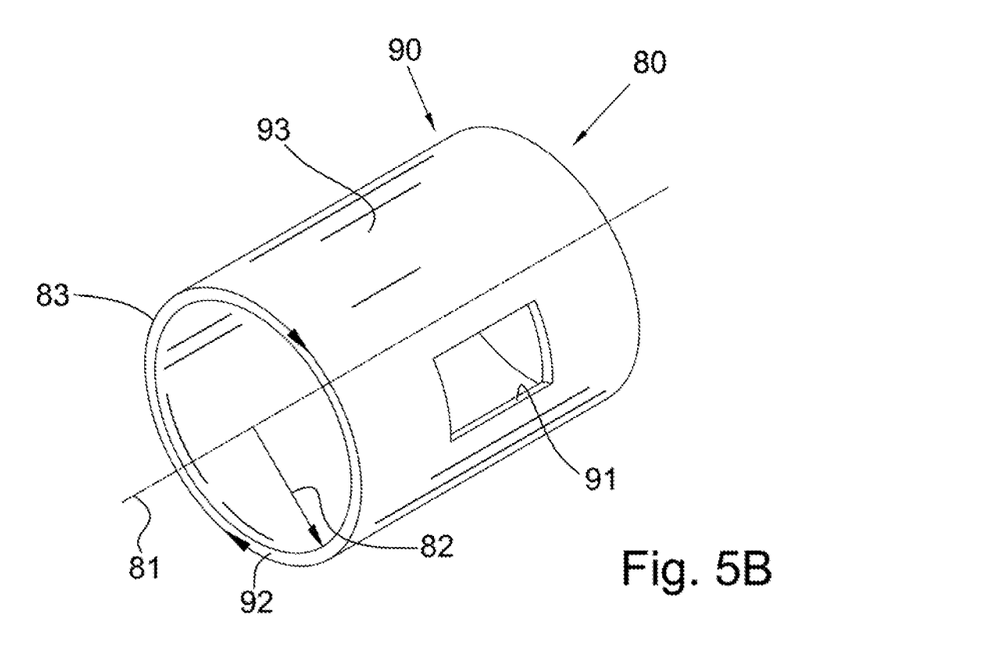

FIG. 5B is a perspective view of object 90 in cylindrical coordinate system 80 of FIG. 5A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 1:
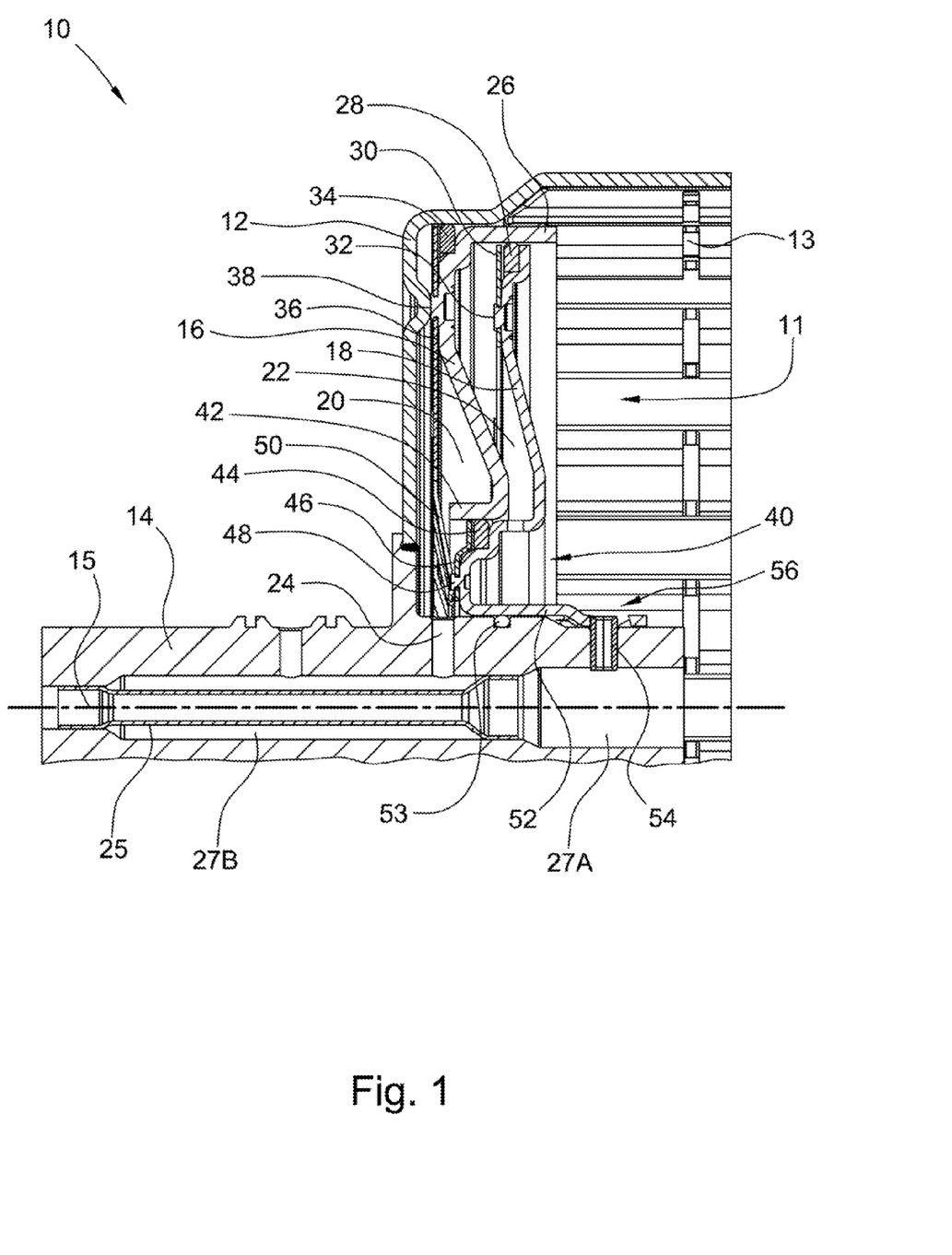
FIG. 1 is a cross-sectional view of a clutch carrier having a piston subassembly according to the current invention.
Figure 2:
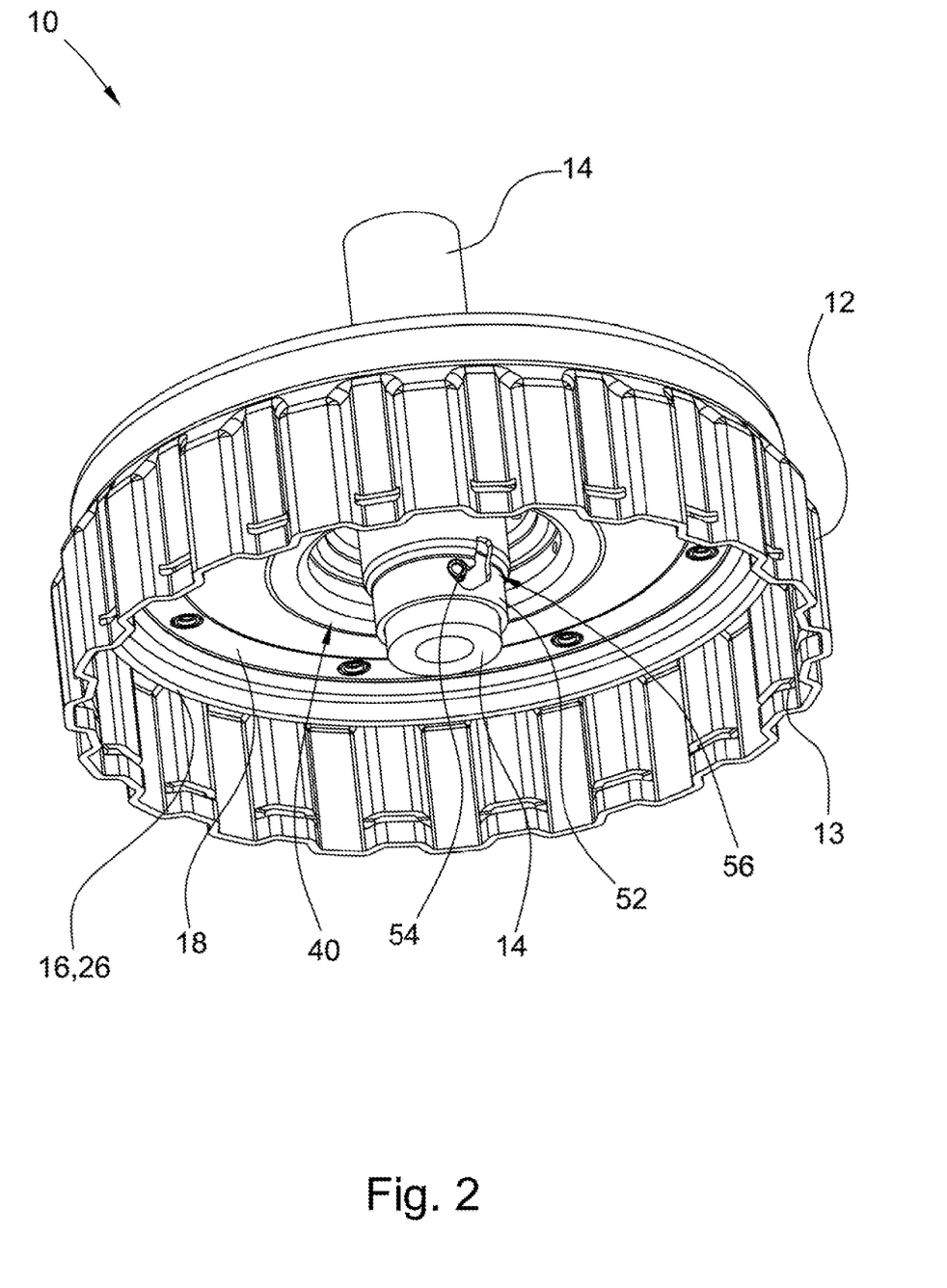
FIG. 2 is a perspective view of a the clutch carrier shown cross-sectionally in FIG. 1.
Figure 3:
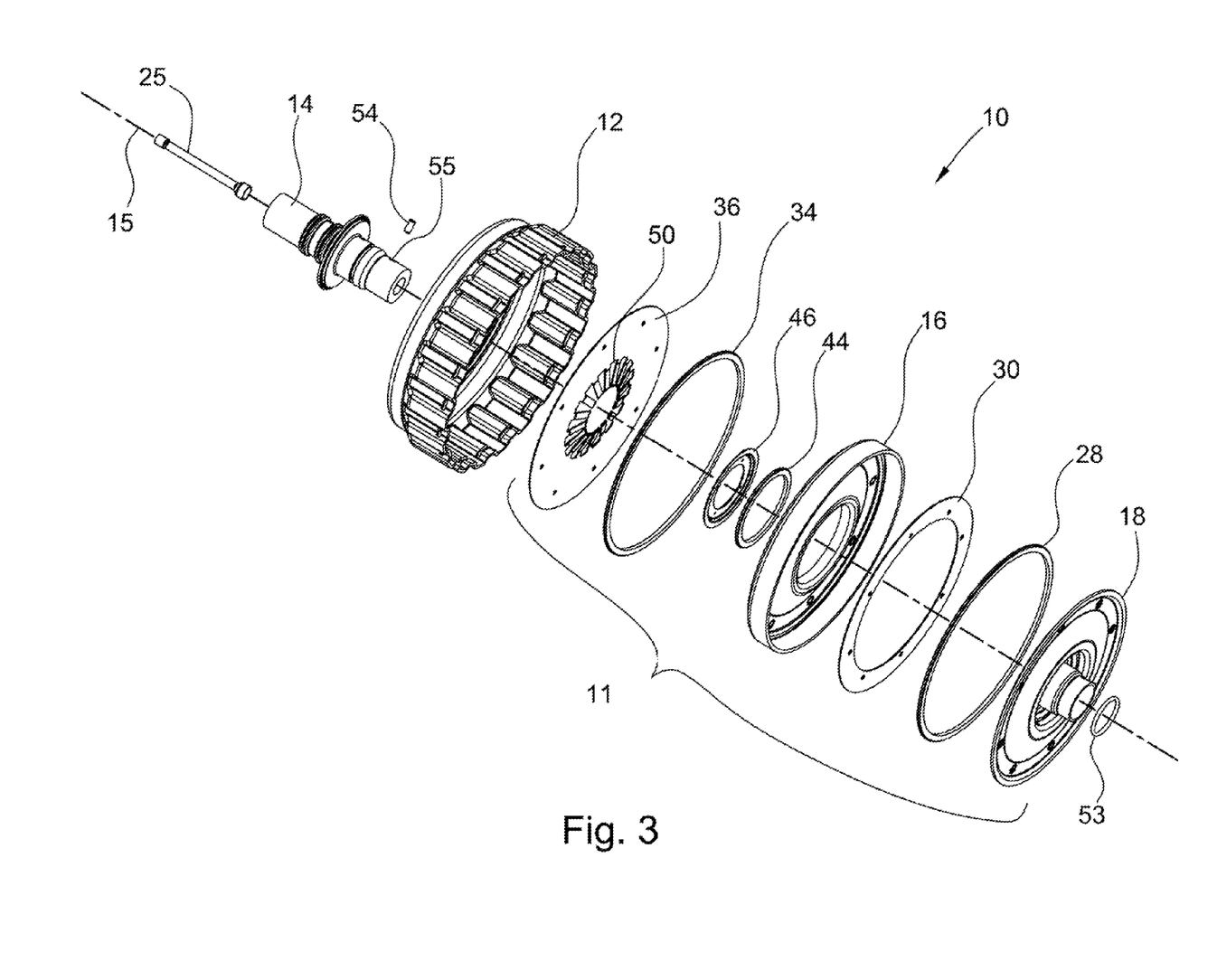
FIG. 3 is an exploded perspective view of the clutch carrier and piston subassembly of the current invention.

Referring now to the figures of the invention, FIG. 1 shows transmission clutch assembly 10. The components of assembly 10 can be further appreciated as illustrated in FIGS. 2 and 3. Accordingly, the following paragraphs should be read in view of FIGS. 1-3. Assembly 10 includes piston subassembly 11 housed within clutch drum or carrier 12. The carrier may include slots 13 for engagement with a snap ring for securing one or more clutch plates in place within carrier 12. Unlike the prior art, the snap ring installed in slots 13 is a final component used to complete the assembly of assembly 10. Therefore, it can be checked immediately for proper seating, and the entire assembly does not need to be disassembled in order to reseat the snap ring if it is found to be installed improperly. Carrier 12 is included on transmission shaft 14. The assembly is aligned on axis 15 of shaft 14.

Piston subassembly 11 includes piston 16 and compensation dam 18, housed within carrier 12. Apply chamber 20 is formed between the piston and carrier, while chamber 22 is located between the piston and the compensation dam. Chamber 20 is in fluid communication with the inner bore of shaft 14 via opening 24. By providing higher pressure fluid into chamber 20 than in chamber 22, the piston axially moves so that the piston, specifically outer flange 26 of the piston, presses against and engages a clutch, which clutch is also housed within the carrier. Clutches are well known in the art, and any known clutch, clutch pack, or clutch plate assembly may be used in assembly 10. For example, see the clutch packs of the '295, '445, or '322 patents, which patents were incorporated by reference, above. Separator 25 is used to bifurcate the inner bore of shaft 14 into chambers 27A and 27B to enable separate flows of a high pressure fluid and a lower pressure fluid through the shaft, respectively.

Seal 28 is included between piston 16 and compensation dam 18 to provide sealed sliding engagement of the piston with the compensation dam. Seal 28 is held in place by clip 30 which is affixed to the compensation dam, such as by rivet 32. Similarly, seal 34 is included between piston 16 and carrier 12 to provide sealed sliding engagement of the piston within the carrier. Clip 36 is used to hold seal 34 in place between the piston and the carrier. Clip 36 is affixed to piston 16 such as by rivet 38. It should be appreciated that rivets 32 and 38 could be any other permanent or detachable affixing or securing means known in the art, such as a bolt, weld, pin, or the like.

Dam 18 includes axial bulge 40 such that inner flange 42 of the piston engages against the compensation dam. Seal 44 is included to provide sealed sliding engagement between flange 42 of piston 16 and dam 18. Clip 46 is included to hold seal 44 between the inner flange of the piston and the axial bulge of the dam. Clip 46 is secured or affixed to dam 18 by rivet 48. Like rivets 32 and 38, it should be appreciated that rivet 48 could be any other affixing or securing means known in the art, such as a bolt, weld, pin, or the like.

Rivet 48 may also used to affix clip 36 to dam 18. Specifically, clip 36 includes fingers 50 which are secured to dam 18 via rivet 48 in one embodiment. By including fingers 50, clip acts as a return spring for the system. Thus, it should be appreciated that fingers 50 could be other similar resilient spring elements which are affixed to, or integral with clip 36. Further, it should be appreciated that any number of fingers or spring elements could be included. In some embodiments, fingers 50 are not secured to dam 18 or clip 46, but exert a force against dam 18, such as by pressing against clip 46 and/or rivet 48. Once installed, as described below, dam 18 is preferably immobile. Thus, clip 36 should be positioned in carrier 12 so that even when the piston is the furthest axial distance away from the dam as possible (i.e., the open position, as shown in FIG. 1), fingers 50 continue to exert a suitable force on dam 18 to hold piston 16 in the open position. The force exerted by fingers 50 is achieved by pre-loading the fingers, as described below. Fingers 50 act to cause clip 36 to "pull" piston 16 away from dam 18 when chamber 20 is not filled with a high pressure fluid. Thus, fingers 50 generally resemble leaf springs, and clip 36, together with fingers 50, acts as a return spring for the system for returning the piston to its open position, at which position the clutch or clutch pack would be disengaged. It should also be appreciated that axial bulge 40 is included in dam 18 to provide a surface against which inner flange 42 of the piston can seal. Bulge 40 also enables the compensation dam to protrude axially past the piston in order to provide a ground or fixed anchoring point for fingers 50 of clip 36 to engage against so that the fingers can pull the piston away from the dam due to the preloaded force exerted by the fingers.

It should be appreciated that since the return spring is not sandwiched between the piston and the compensation dam, the piston and dam can be shaped and positioned so that they more closely match each other during actuation of the piston, resulting in a more compact design. That is, additional room is not needed between the piston and compensation dam, because no spring elements are installed between those components. Furthermore, a retaining would be required, regardless of where the spring is positioned, in order to hold seal 34 in place. Thus, the by incorporating fingers 50 with clip 36, the clip serves as both a seal retaining clip and as a return spring for the piston, and separate components are not needed for each of these tasks.

The dam includes inner flange 52 which engages against shaft 14. Seal 53 may be included between shaft 14 and dam 18 in order to prevent leakage of fluid from chamber 20. Pin 54 is included between flange 52 of dam 18 and shaft 14 for securing restricting movement of the dam with respect to the shaft. In the shown embodiment, pin 54 is hollow and inserted into fluid flow hole 55 in the shaft which is used to enable fluid communication between a clutch chamber in the carrier 12 and inner bore portion 27A of shaft 14, in order to cool the clutch plates, for example. By making pin 54 hollow, this same fluid communication is possible, even when the pin is inserted into hole 55. In another embodiment, pin 54 is solid and inserted into a hole which is designated specifically to receive the pin. In the shown embodiment, pin 54 is engaged with angled groove 56 of dam 18. Pin 54 could be any other protrusion, bump, projection, etc., radially extending out from shaft 14 which is engagable with slot 56.

Figure 4:
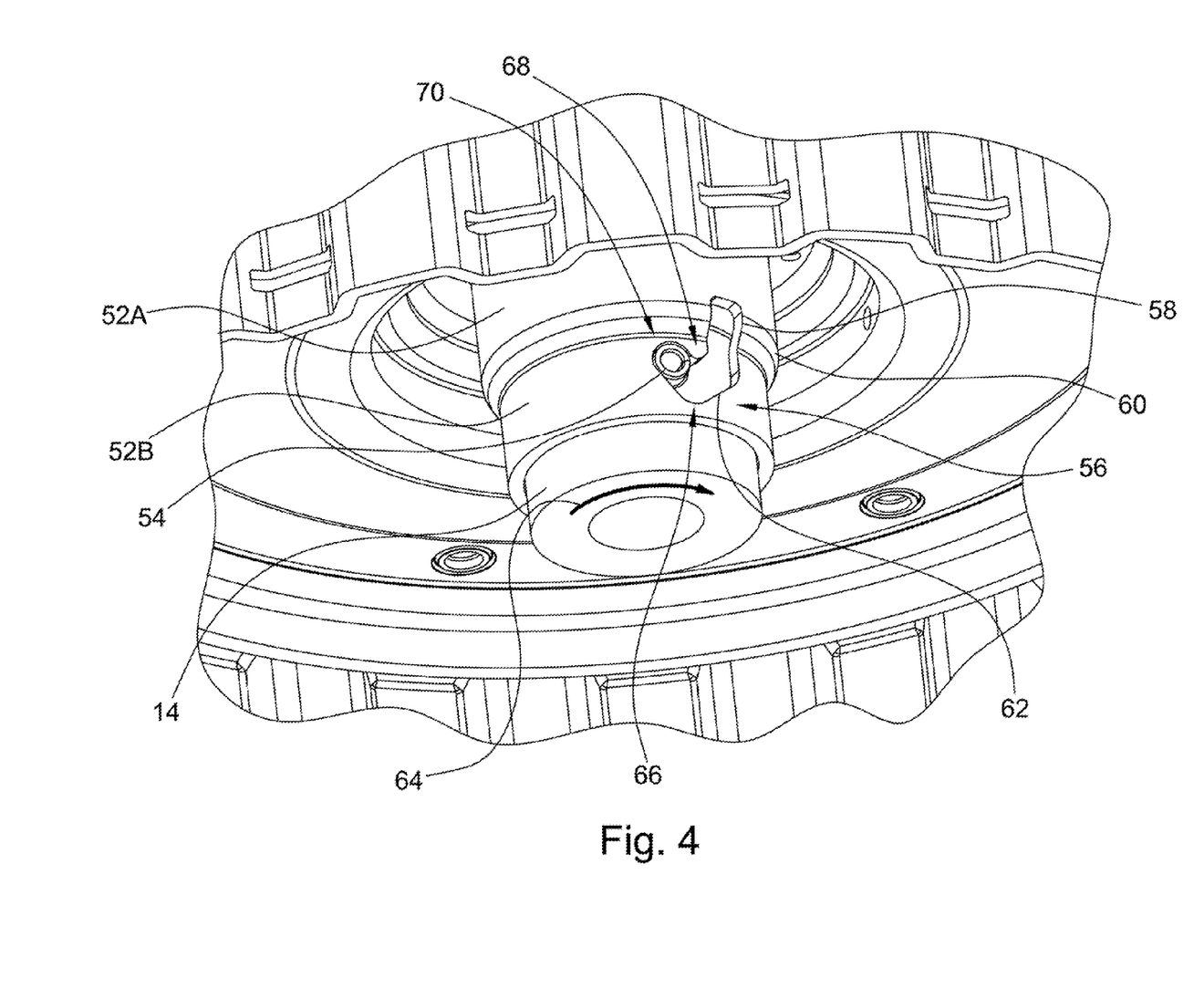
FIG. 4 is an enlarged view of a twist lock mechanism of the piston subassembly shown in FIG. 2.

The following is described with respect to FIG. 4. Pin 54 and angled groove 56 together create a twist lock mechanism that secures the dam onto the transmission shaft. In the shown embodiment, groove 56 includes receiving portion 58. The receiving portion is arranged to engage with pin 54 when the dam is slid axially onto shaft 14. In the shown embodiment, flange 52 of dam 18 includes transition 60 from wide segment 52A to narrow segment 52B. By wide and narrow, it is meant having a larger and smaller radius, respectively. Pin 54 should protrude from shaft 14 a radial distance such that segment 52A is able to slide over the pin without interference, but so that segment 52B can not. That is, instead the portion of slot 56 in narrow segment 52B engages with the pin. Receiving portion 58 spans transition 60 such that it is formed in wide segment 52A and narrow segment 52B of flange 52. In this way, receiving portion 58 can first be aligned with pin 54, then dam 18 slid onto shaft 14 so that the pin is received by receiving portion 58, and subsequently engaged with the portion of angled slot 56 that is formed in narrow portion 52B of flange 52.

In order to assemble subassembly 11 and to pre-load fingers 50 of clip 36, dam 18 must be pressed in the axial direction toward piston 16. By continuing to press dam 18 axially in the direction of piston 16, the pin will transition down receiving portion 58 in order to engage against angled portion 62 of slot 56. Continuing to press axially against the dam 18 will cause the dam to rotate about axis 15 in the direction indicated by arrow 64, due to the oblique slanting of angled portion 62 in both the axial and circumferential directions. That is, the dam must rotate in direction 64 (circumferentially) in order for the dam to continue to axially move toward piston 16. In some embodiments, torque may need to be applied in order to assist in the rotation of the dam, for example, to overcome friction drag from the seals. The dam can move axially until pin 54 becomes engaged in trough or seat 66 of angled slot 56, at which point the engagement of the pin in trough 66 will prohibit further travel of the dam toward piston 16. At this point, fingers 50 are compressed significantly, and are exerting a force greater than the necessary minimum pre-load force. It should be appreciated that slot 56 does not necessarily need to include angled portion 62, but could instead include a portion which transitions between the receiving portion and seat 70 in an entirely circumferential direction. However, in such an embodiment, torque would have to be applied along with an axial force in order for the pin to traverse down this circumferential portion.

Then, after engagement of the pin in seat 66, the axial pressing on the dam can be released and the pre-load force set for fingers 50 of clip 36. That is, the fingers will attempt to return to their natural state, pushing the dam in a direction axially away from the piston. While being axially pushed by the fingers away from the piston, shunt 68 will direct the pin into final indentation, notch, or seat 70. That is, shunt 68 is circumferentially offset with respect to seat 66 such that when fingers 50 are allowed to push the dam axially away from the piston and the pin transitions from trough 66 to seat 70, the pin will always hit shunt 68 on the side facing seat 70 so that the shunt directs the pin into seat 70 and not back into receiving segment 58.

Once in seat 70, the fingers will continue to exert the pre-load force against the dam to hold the pin in seat 70. That is, the seat 70 should be set so that when the dam is locked by pin 54, the fingers of clip 36 are compressed an amount so that the fingers exert the minimum desired pre-load force on the dam. Thus, the relationship between fingers 50 on clip 36, piston 16, dam 18, pin 54, and seat 70 of angled slot 56 should be set such that the inability of the dam to axially move, due to the pin locked in seat 70, will keep the fingers exerting the desired pre-load force. Thus, advantageously, the pre-loaded force is responsible for locking the dam into position, and it is the fact that the dam is locked in position which maintains the pre-load force. That is, the pre-loaded force effectively maintains itself by holding the dam in place. Thus, it should be appreciated that embodiment described above locks piston subassembly 11 within carrier 12 without the use of a snap ring. It also does so with fewer compoenents because the return spring and seal clip are combined into clip 36, which includes fingers 50. Furthermore, when piston 16 is axially forced toward dam 18 for engagement of the transmission clutch, fingers 50 exert an even greater force on the dam, so the dam will never become loose and/or disengage from the pin in the shaft, unless manipulated manually in order to achieve that result.

Advantageously, the current invention assembly enables removal of the clutch plates of the carrier without the need to disturb or disassemble the piston assembly. It also enables assembly 10 to be assembled using subassemblies, such as piston subassembly 11, in order to facilitate the original manufacture of assembly 10. Thus, it should be appreciated that piston subassembly 11 could be fully assembled before being housed in carrier 12, or the subassembly could be assembled as components are added into the carrier. That is, either the piston can first be nested within the carrier, then the dam added in place, or by first nesting the piston with the dam to form subassembly 11, and nesting the complete subassembly into the carrier. Furthermore, it should be appreciated that after assembly, a simple height measurement can be used to check if subassembly 11 is fully assembled. In the case of a snap ring, such a measure would not necessarily identify a problem. Also, it is easy to visually confirm that pin 54 is engaged in seat 70.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A piston subassembly for operating a clutch of a transmission comprising:
    a carrier;
    a piston;
    a compensation dam, wherein said piston is axially moveable with respect to said compensation dam; and,
    a clip operatively affixed to said piston, said clip operatively arranged between said piston and said carrier, said clip including at least one spring element for exerting a force between said dam and said piston to pull said piston axially away from said compensation dam.

2. The piston subassembly of claim 1, wherein said compensation dam is included on a transmission shaft, said compensation dam including a radially inner flange having a slot, wherein said slot is operatively arranged to engage with a radial protrusion on said transmission shaft for forming a twist-lock between said compensation dam and said shaft.

3. The piston subassembly of claim 2, wherein said slot includes a first portion for receiving said protrusion and a second portion for maintaining continuous locked engagement of said slot with said radial protrusion due to said force exerted by said clip on said dam.

4. The piston subassembly of claim 3, wherein said second portion of said slot comprises an axial indentation or notch.

5. The piston subassembly of claim 3, wherein said first portion of said slot comprises an axial strip.

6. The piston subassembly of claim 3, wherein said slot further comprises a third portion, said third portion extending in at least a circumferential direction between said first portion and said second portion for enabling said radial protrusion to transition from engagement with said first portion to engagement with said second portion.

7. The piston subassembly of claim 6, wherein said third portion is angled obliquely between said first portion and said second portion in both said circumferential direction and an axial direction.

8. The piston subassembly of claim 2, wherein said radial protrusion is a pin inserted into a hole in said shaft.

9. The piston subassembly of claim 8, wherein said pin is hollow for enabling a flow of fluid between said carrier and an inner bore of said shaft.

10. The piston subassembly of claim 1, wherein a flange of said piston extends axially past said compensation dam for engaging a clutch of a transmission due to an axial position of the piston.

11. The piston subassembly of claim 1, wherein said dam includes an axial bulge for enabling said clip to engage against said compensation dam while remaining affixed to said piston.

12. The piston subassembly of claim 1, further including at least one seal between said piston and said compensation dam, said seal operatively arranged to enable said piston to remain in sealed engagement with said carrier while moving axially within said carrier.

13. The piston subassembly of claim 12, wherein said clip retains said at least one seal in engagement between said piston and said carrier.

14. The piston subassembly of claim 1, wherein said at least one spring element comprises a plurality of resilient fingers.

15. A transmission assembly including:
    a transmission shaft;
    a clutch carrier installed on said shaft, and,
    the piston subassembly of claim 1, said piston subassembly housed within said carrier.

16. The transmission assembly of claim 15, wherein said compensation dam is installed on said transmission shaft, said compensation dam including a radially inner flange having a slot, wherein said slot is operatively arranged to engage with a radial protrusion on said transmission shaft for forming a twist-lock mechanism between said compensation dam and said shaft.

17. The transmission assembly of claim 16, wherein said slot includes a first portion for receiving said radial protrusion and a second portion for maintaining continuous locked engagement of said slot with said radial protrusion due to said force exerted by said at least one spring element on said dam.

18. An assembly for operating a clutch of a transmission comprising:
    a carrier;
    a piston;
    a compensation dam, wherein said piston is axially moveable with respect to said compensation dam;

a clip operatively affixed to said piston, said clip operatively arranged between said piston and said carrier, said clip including at least one spring element for exerting a force between said dam and said piston to pull said piston axially away from said compensation dam, said clip also retaining a seal for said piston; and, wherein said compensation dam is included on a transmission shaft, said compensation dam including a radially inner flange having a slot, wherein said slot is operatively arranged to engage with a radial protrusion on said transmission shaft for forming a twist-lock between said compensation dam and said shaft, said slot comprising:

an axial strip for receiving said protrusion;

an axial indentation for providing continuous locked engagement with said radial protrusion after assembly of said piston subassembly due to said force exerted by said clip on said dam; and, a circumferential portion, said circumferential portion extending in at least said circumferential direction between said axial strip and said axial indentation for enabling said radial protrusion to transition from engagement with said axial strip to engagement with said axial indentation.

* * * * *